United States Patent
Ingole et al.

(10) Patent No.: US 9,390,076 B2
(45) Date of Patent: Jul. 12, 2016

(54) MULTI-PART AND SINGLE RESPONSE IMAGE PROTOCOL

(71) Applicant: Microsoft Technology Licensing, LLC, Redmond, WA (US)

(72) Inventors: Harshal Ingole, Mountain View, CA (US); Sarah Ferraro, Mountain View, CA (US); Gilberto Aristides Apodaca Aragon, Hayward, CA (US); Christopher Hayworth, Richmond (CA); Szymon Gizecki, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 13/911,539

(22) Filed: Jun. 6, 2013

(65) Prior Publication Data
US 2014/0365863 A1 Dec. 11, 2014

(51) Int. Cl.
*G06F 17/00* (2006.01)
*G06F 17/22* (2006.01)
*G06F 17/30* (2006.01)

(52) U.S. Cl.
CPC ...... *G06F 17/2247* (2013.01); *G06F 17/30247* (2013.01); *G06F 17/30902* (2013.01)

(58) Field of Classification Search
CPC .............. G06F 17/2247; G06F 17/24; G06F 17/30247; G06F 17/3028
USPC ....................................................... 715/234
See application file for complete search history.

(56) References Cited

U.S. PATENT DOCUMENTS

| | | | | | |
|---|---|---|---|---|---|
| 5,845,084 | A | * | 12/1998 | Cordell | G06Q 30/02 709/232 |
| 5,852,439 | A | * | 12/1998 | Musgrove | G06F 3/0481 715/764 |
| 6,055,522 | A | * | 4/2000 | Krishna | G06F 17/30893 715/205 |

(Continued)

OTHER PUBLICATIONS

"PowerPoint Web Editor Data Protocol", Published on: Feb. 11, 2013, Available at: http://download.microsoft.com/download/1/6/F/16F4E321-AA6B-4FA3-8AD3-E94C895A3C97/[MS-PWEDPS].pdf.

(Continued)

*Primary Examiner* — Laurie Ries
(74) *Attorney, Agent, or Firm* — Julie Kane Akhter; Tom Wong; Micky Minhas

(57) ABSTRACT

This disclosure describes systems and methods for displaying images on a browser. When a user opens a page/slide in a web application, a web application client generates a unique identifier for each image on the page, combines the identifiers for each image in a URL, and forwards the URL to a web application server. The web application server then parses the request and follows the URL to render and/or fetch each requested image. The web server encodes the requested images, combines the encoded images in a response string, and returns the response string to the browser. The browser parses the response string to display the requested images and adds each encoded image to a content data model for the web application. In embodiments, the browser stores the response string in a browser cache for subsequent retrieval and display of one or more images.

20 Claims, 11 Drawing Sheets

(56) References Cited

U.S. PATENT DOCUMENTS

| | | | |
|---|---|---|---|
| 6,833,865 B1* | 12/2004 | Fuller | G06F 17/30247 348/231.2 |
| 7,032,168 B1* | 4/2006 | Gerace | G06Q 30/0277 705/14.73 |
| 7,050,654 B2 | 5/2006 | Lunetta et al. | |
| 7,340,499 B1 | 3/2008 | Casella | |
| 7,870,190 B2 | 1/2011 | Takakura et al. | |
| 7,890,858 B1 | 2/2011 | Graham et al. | |
| 8,010,624 B2 | 8/2011 | Scott et al. | |
| 9,135,227 B2* | 9/2015 | Warila | G06F 8/24 |
| 2002/0033844 A1* | 3/2002 | Levy | G06F 21/10 715/744 |
| 2003/0009527 A1* | 1/2003 | McIntyre | G06F 17/30247 709/206 |
| 2003/0028543 A1* | 2/2003 | Dusberger | G06F 17/30244 |
| 2004/0177147 A1* | 9/2004 | Joshi et al. | 709/227 |
| 2005/0080871 A1 | 4/2005 | Dinh et al. | |
| 2005/0091311 A1* | 4/2005 | Lund et al. | 709/203 |
| 2005/0234983 A1* | 10/2005 | Plastina | G06F 17/30247 |
| 2005/0250548 A1* | 11/2005 | White | 455/566 |
| 2005/0276442 A1* | 12/2005 | Alasia | G06T 1/0028 382/100 |
| 2006/0206795 A1 | 9/2006 | Hess et al. | |
| 2007/0065045 A1* | 3/2007 | Iwasaki | G06K 9/6203 382/305 |
| 2008/0222273 A1* | 9/2008 | Lakshmanan | G06F 17/30247 709/219 |
| 2009/0007018 A1* | 1/2009 | Ikeda | G06F 17/3028 715/838 |
| 2009/0316005 A1* | 12/2009 | Ito | G06F 17/30247 348/207.1 |
| 2010/0283640 A1* | 11/2010 | Esbensen | G06F 17/2217 341/106 |
| 2011/0066676 A1* | 3/2011 | Kleyzit | G06F 17/30902 709/203 |
| 2011/0153351 A1* | 6/2011 | Vesper | G06Q 10/10 705/2 |
| 2011/0161952 A1* | 6/2011 | Poddar | G06F 9/455 717/173 |
| 2012/0036264 A1* | 2/2012 | Jiang | G06F 17/30902 709/226 |
| 2012/0166435 A1* | 6/2012 | Graham | G06F 17/30017 707/728 |
| 2012/0170856 A1* | 7/2012 | Yamaguchi | G06F 17/30268 382/224 |
| 2012/0291071 A1* | 11/2012 | Seo | H04N 21/26283 725/41 |
| 2012/0311623 A1* | 12/2012 | Davis | H04N 5/765 725/18 |
| 2012/0311723 A1* | 12/2012 | Britt, Jr. | G06F 17/30023 726/28 |
| 2013/0111327 A1* | 5/2013 | Tsutsui et al. | 715/234 |
| 2013/0260727 A1* | 10/2013 | Knudson | G06Q 30/00 455/414.1 |
| 2013/0304604 A1* | 11/2013 | Hoffman | G06Q 30/0621 705/26.5 |

OTHER PUBLICATIONS

"Minimize Round-Trip Times", Published on: May 5, 2012, Available at: https://developers.google.com/speed/docs/best-practices/rtt#SpriteImages.

"Best Practices for Speeding up Your Web Site", Retrieved on: Apr. 1, 2013, Available at: http://developer.yahoo.com/performance/rules.html.

"Image Stitching", Retrieved on: Apr. 5, 2013, Available at: http://en.wikipedia.org/wiki/Image_stitching.

International Search Report and Written Opinion Issued in PCT Application No. PCT/US2014/040162, Mailed Date: Nov. 28, 2014, 12 Pages.

PCT 2nd Written Opinion in International Application PCT/US2014/040162, mailed Apr. 23, 2015, 8 pgs.

PCT International Preliminary Report on Patentability in International Application PCT/US2014/040162, mailed Sep. 10, 2015, 9 pgs.

* cited by examiner

MULTI-PART AND SINGLE RESPONSE IMAGE PROTOCOL

BACKGROUND

Traditionally, when a webpage opens, the HyperText Markup Language (HTML) for the webpage contains uniform resource locators (URLs) that point to a path for each image. However, in some cases, browsers may be used for editing, creating, and viewing images using a web application that requires images to be dynamically generated by a server during a session, e.g., web applications such as, but not limited to, PowerPoint® or other graphics-intensive programs. For applications that use dynamically generated images, these URLs cannot exist in the initial HTML because the images do not yet have locations to fetch from. Instead, these web applications must first send a request to the server to get a location for each image. Upon receipt of the request, the web application server renders each image, stores the rendered images in a server cache, and generates a URL for retrieving each image from the server cache. The web application server then returns the URL for retrieving each requested image in a response to the browser. Upon receipt, the web application client adds the URL for each image to the document object model (DOM) in the proper location. Thereafter, the browser uses these URLs as the locations from which to fetch each image for display on the webpage. Specifically, upon receiving an image request from the browser referencing a URL, the web application server returns the requested image in a response as a .jpeg (Joint Photographic Experts Group), .png (Portable Network Graphics), .gif (Graphics Interchange Format), BMP (bitmap), or any other appropriate image file format to the browser. The browser thereafter displays the webpage with the requested image.

In some cases, for instance when a user returns to a page or slide of the web application that was previously viewed and has not been edited, the web application client may retrieve the URLs for the previously requested images from the content data model (or DOM). Moreover, the browser may have stored the image files for the previously requested images in a browser cache. If so, the browser may display the previously requested images without forwarding a request to the web application server.

Traditionally, as described above, because the URL for retrieving an image was generated by the web application server, the web application client was required to obtain the URL before it could request and display an image. That is, the first time an image was displayed on the browser, at least two requests to the web application server were required: a first request to obtain the URL for the image and a second request referencing the URL to fetch the image for display. Accordingly, traditional methods may demonstrate inefficiencies in rendering and displaying images on a browser.

It is with respect to these and other general considerations that embodiments have been made. Also, although relatively specific problems have been discussed, it should be understood that the embodiments should not be limited to solving the specific problems identified in the background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present disclosure provide a method and system for displaying images on a browser. For example, when a user opens a page (or slide) in a web application, a web application client generates a unique identifier for each image on the page, combines the identifiers for each image in a URL (which is a request string), and forwards the URL to a web application server. The web application server then parses the request, generates each image (in some cases, fetching one or more images from a file storage disk), encodes the images, combines the encoded images in a response string, and returns the response string to the browser. The response string is then parsed to retrieve and display each image on the browser. In embodiments, the browser stores the response string in a browser cache. When the user returns to the same page, for example, the browser may retrieve the response string from the browser cache for subsequent retrieval and display of the images. Thus, in embodiments, repeated requests to the server are eliminated, thus displaying images faster.

Specifically, in embodiments, a method for displaying one or more images in a web application on a browser is provided. The method comprises determining to display a first image on the browser, wherein the first image was not previously displayed on the browser. The method further comprises generating a first identifier that is specific to a first image and sending an image request for the first image to a server, wherein the image request references the first identifier. Additionally, the method comprises receiving a response containing encoded image data for the first image and displaying the first image on the browser.

In further embodiments, a computer-readable medium storing instructions for generating one or more images for display in a web application on a browser is provided. The instructions when executed causing a computing device to perform a method comprising receiving an image request for a first image from a browser, the image request referencing a first identifier and following the first identifier to retrieve the first image. The method further comprises generating encoded image data for the first image and sending the encoded image data for the first image in a response to the browser.

In further embodiments, a computing system is provided. The computing system comprises at least one processor and at least one memory storing instructions that when executed by the at least one processor cause the computing system to perform a method for displaying one or more images in a web application on a browser. The method comprises determining to display a first image on the browser, wherein the first image was not previously displayed on the browser and generating a first identifier that is specific to the first image. The method further comprises sending an image request for the first image to a server, wherein the image request references the first identifier. Additionally, the method comprises receiving a response containing encoded image data for the first image and displaying the first image on the browser.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the claims.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
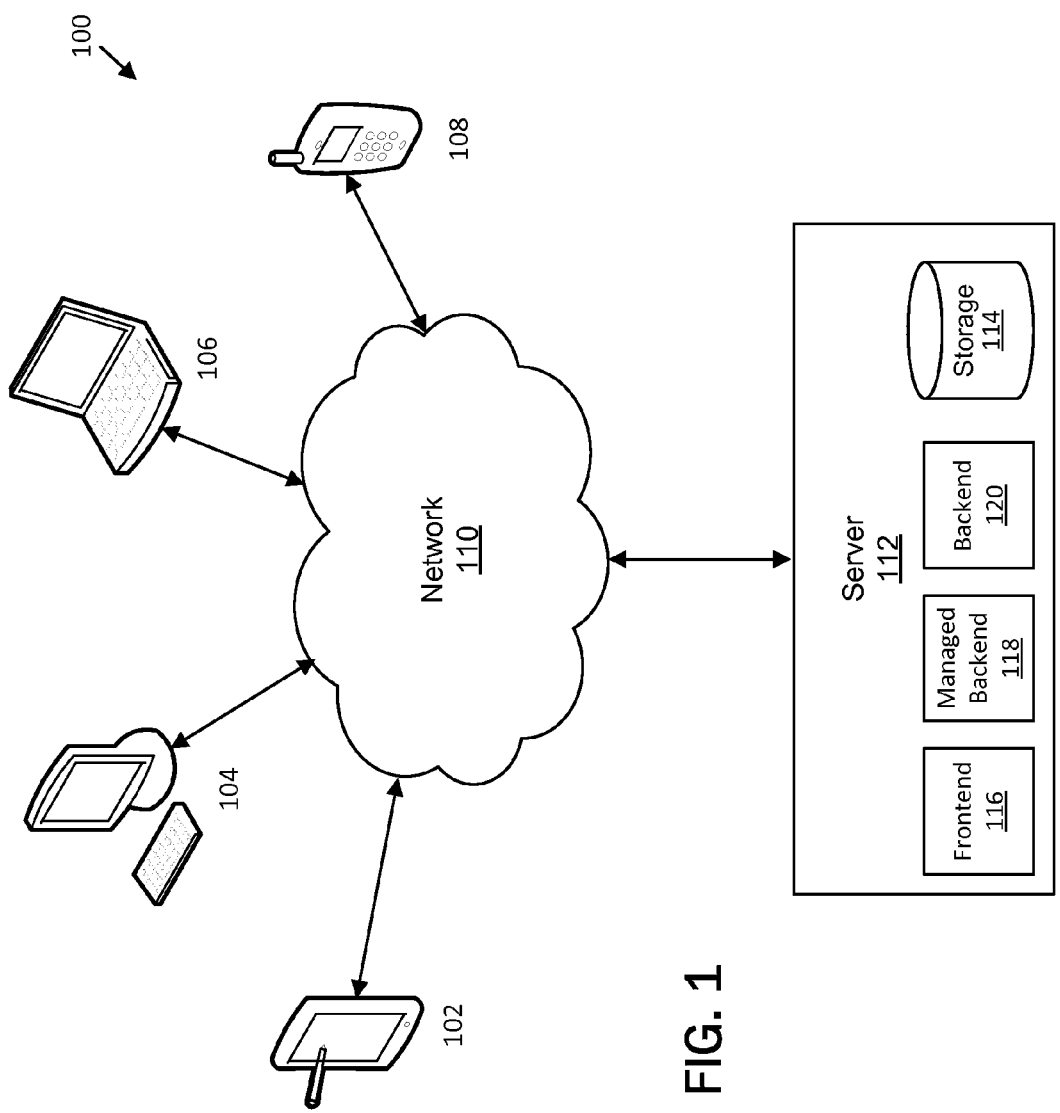
FIG. 1 illustrates a network system for displaying images of a web application on a browser.

FIG. 1 illustrates a system for displaying images of a web application on a browser. The system 100 includes a first client 102, a second client 104, a third client 106, and a fourth client 108. Although four clients are shown, it is contemplated that fewer or additional clients may access the server 112 through the network connection 110. Each client represents a user capable of accessing the web application via a web browser through the network connection 110 using a computing device. The web browser may include a browser cache. In other embodiments, the browser may be more limited, e.g., on thin clients such as smart phones and tablets which may not have browser cache functionality. Example computing devices are described in further detail with reference to FIGS. 7-9. In this embodiment, the frontend 116, managed backend 118, and backend 120 operate on the server 112. Although three server parts are shown and described, it is contemplated that fewer or additional parts may operate on the server 112. Thus, in some embodiments, one or more servers may be used to implement aspects of this disclosure. The server also includes one or more processors and system memory 114, including file storage and/or caches.

Figure 2A:
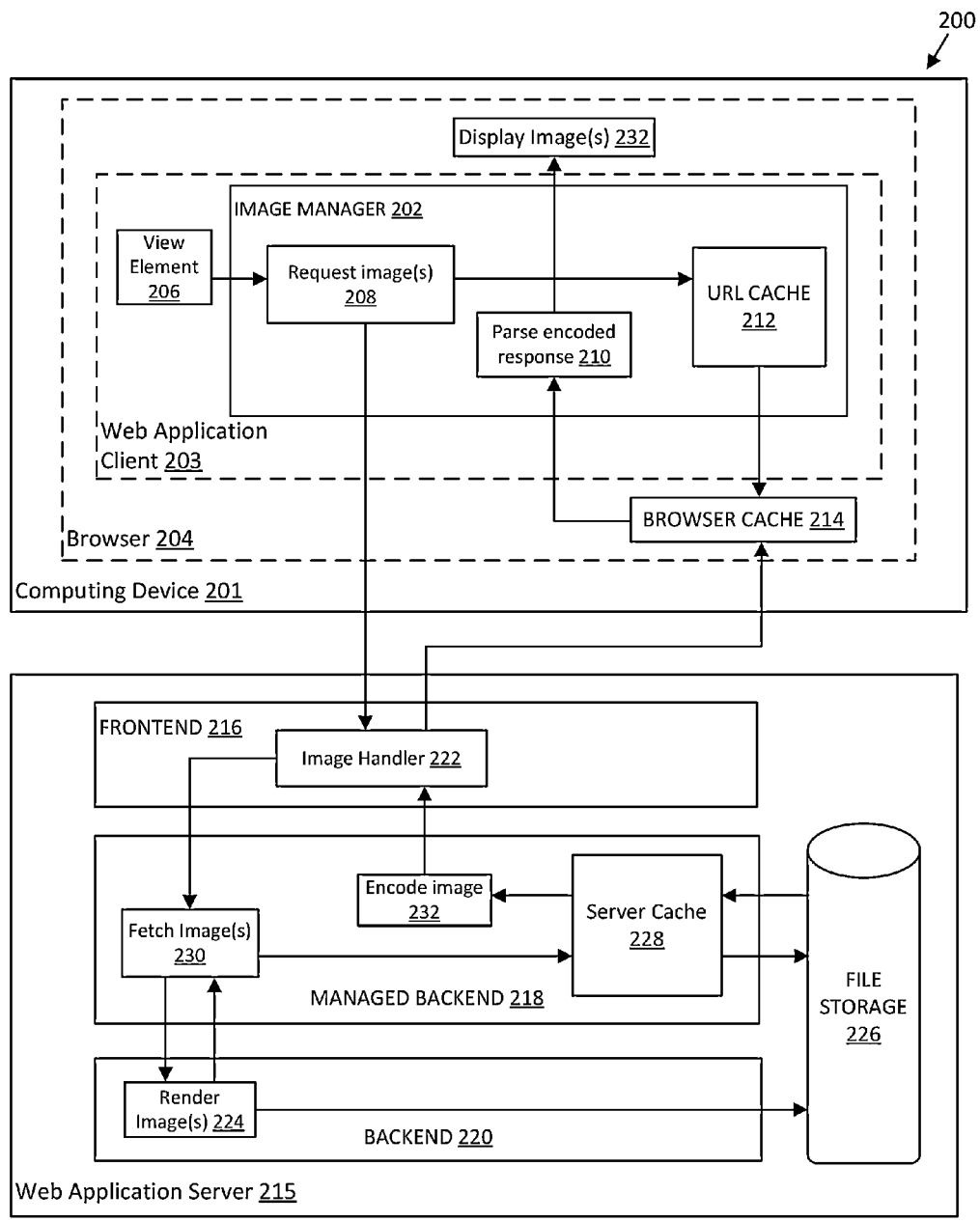
FIG. 2A illustrates a block diagram of an embodiment of a system architecture used for generating, retrieving, and displaying images using a web application on a browser.

FIG. 2A illustrates a block diagram of an embodiment of a system architecture 200 used for generating, retrieving, and displaying images in a web application on a browser. As shown in FIG. 2A, the system architecture 200 includes a computing device 201, a web application client 203 operating thereon, and a web application server 112. The system architecture 200 further includes an image manager 202 and a browser 204 operating on the computing device 201. For simplicity, computing device 201 is used as a reference and is meant simply as an illustration; however, any client computing device 102-108 as described with reference to FIG. 1 can also be used.

As shown in FIG. 2A, the web application client includes an image manager 202. A view element 206 may be called as a result of an action by a user using a web application operating on a computing device 201. User actions include, but are not limited to, adding a new shape to a slide (or page), changing the theme of one or more slides, or viewing (or opening) a new slide. In embodiments, the view element 206 may include get requests for one or more images.

Based on the view element 206, the web application client 203 generates an image request that identifies a list of resources that need to be fetched from the web application server 215. The image request includes metadata identifiers such as a presentation identifier, a session identifier, a resolution, and at least one item identifier. For example, the image request may be in the form of a hypertext transfer protocol (http) request (or URL) as follows:

http://sarahjonesdev2/p/
editimageHandler.ashx?Pid=jifewlsck&sid=ienkbisld
&res=67.89&item=sld3sp4bg.jfdise&item=sld5bg.jfdsiels In the image request above, the presentation identifier (Pid) is "jifewlsck," the session identifier (Sid) is "ienkbisld," and the resolution (res) (also referred to as device size) is "67 by 89." Moreover, the image request above is a batched image request including two item identifiers, the first item identifier is "sld3sp4bg.jfdise" (i.e., slide 3, shape 4, background, version jfdise) and the second item identifier is "sld5bg.jfdsiels" (i.e., slide 5, background, version jfdsiels). Each item identifier is unique to an image. In embodiments, the identifiers are combined into a URL which includes the information necessary to locate or render the requested images on the web application server 215. For example, based on the image request above, the URL for the first item (or first image) is: "Pid=jifewlsck&sid=ienkbisld&res=67.89&item=sld3sp 4bg.jfdise" and the URL for the second item (or second image) is: "Pid=jifewlsck&sid=ienkbisld&res=67.89& item=sld5bg.jfdsiels." Thus, in embodiments, an image request having one item identifier is referred to as an image URL request and an image request having more than one item identifier is referred to as a batched image URL request. In embodiments, a batched image URL request may be parsed by the web application server to locate or render more than one image based on following the URL for each image.

In this embodiment, the image manager 202 receives requests from the web application client 203 and communicates with the web application server 215 through the browser 204. The image manager 202 executes a plurality of functions including, but not limited to, requesting 208 one or more images, sending requests to the web application server 215, and parsing 210 responses received from the web application server 215. The image manager 202 also includes a URL cache 212 that stores individual image URL requests and batched image URL requests for later use. The URL cache 212 is described in further detail below.

Also as shown in FIG. 2A, the browser 204 includes a browser cache 214 that stores encoded image responses received from the web application server 215. The encoded image responses may include one encoded image (encoded image response) in response to an image URL request, or more than one encoded image (batched encoded image response) in response to a batched image URL request. The browser cache 214 is responsible for storing encoded image responses and batched encoded image responses until the browser session closes. The browser cache 214 is described in further detail below.

In embodiments, the web application server 215 includes a frontend 216, a managed backend 218, and a backend 220. The web application server 215 also includes file storage 226 that is in data communication with the managed backend 218 and the backend 220. File storage may comprise, but is not limited to, volatile storage (e.g., random access memory), non-volatile storage (e.g., read-only memory), flash memory, or any combination. For simplicity, web application server 215 is used as a reference and is meant simply as an illustration, however server 112 as described with reference to FIG. 1 can also be used. In embodiments, a single server without a frontend, managed backend, and backend may also be used.

According to embodiments, the frontend 216 further comprises an Image Handler 222 that is responsible for parsing the request sent by the image manager 202 and for redirecting individual image requests to the managed backend 218. Additionally, the Image Handler 222 may forward responses produced by the managed backend 218 up to the browser 204.

In further embodiments, the backend 220 is responsible for receiving new image requests from the managed backend 218, rendering 224 the requested images, and storing the newly rendered images in file storage 226.

The managed backend 218 includes a server cache 228 for storing images rendered by the backend 220 that is in communication with file storage 226. In operation, the managed backend 218 is responsible for receiving image requests from the frontend 216, fetching 230 the requested images, encoding 232 requested images into a base64 string, and returning the base64 string to the Image Handler 222.

As explained above, upon receiving the image requests from the frontend 216, the managed backend 218 retrieves images that were previously requested by fetching 230 the requested image from the server cache 228. The managed backend 218 also communicates with the backend 220, which is responsible for rendering images not previously requested and/or rendering images previously requested and currently edited. The rendered images are thereafter stored in file storage 226 and/or server cache 228 for retrieval by the managed backend 218. After retrieving the image(s), the managed backend 218 encodes 232 the image data (for example, in a base64 string) and returns it to the Image Handler 222 for forwarding to browser 204. In embodiments, base64 encoding enables the managed backend 218 to append several image data files together to send as a single response to the browser 204 (e.g., in a batched encoded response). Moreover, base64 encoding is widely recognized by browsers. In other embodiments, other image encoding formats which allow for batching and which are widely recognized, whether currently known or developed in the future, may be utilized. In some embodiments, the managed backend may send the encoded response (or the batched encoded response) directly to the browser 204.

Upon receipt, the browser 204 stores the encoded response in browser cache 214. In some embodiments, the browser cache 214 stores each encoded response (or batched encoded response) received during a web application session. In further embodiments, once a user closes the browser 204, the session ends and the browser cache 214 is purged.

In embodiments, upon receipt of the encoded response (or batched encoded response), the image manager 202 parses the response into its individual images, and sends those images to the browser 204 to be displayed. In further embodiments, the encoded response (or batched encoded response) includes all of the necessary information for displaying the image in the browser. For example, the encoded response may include the item identifier for each image (corresponding to the item identifier provided in the original image URL request), along with a width, a height, x and y offset, and the encoded image data (e.g., base64 image data).

As noted above, the URL cache 212 stores the image URL requests and batched image URL requests. According to embodiments, when a subsequent request 206 is received for an image (for example, when a user subsequently returns to view a slide or page), the image manager 202 may detect that the image was previously requested. In this case, the image manager 202 may locate the previous image URL request for that image in the URL cache 212. In some cases, the image may have been individually requested (i.e., an image URL request). In other cases, the image may have been requested in a batched image URL request. In either case, the previous request (whether individual or batched) may be retrieved from the URL cache 212. Thereafter, the previous request can be mapped to the encoded response (or batched encoded response) stored in the browser cache 214 that was returned for the previous request. In embodiments, the previous encoded response (or batched encoded response) may be parsed to obtain the image data and the image may be re-displayed without sending a request to the web application server 215. By utilizing the browser cache 214, the system 200 can display previously requested images without re-requesting the image from the web application server 215.

Figure 2B:
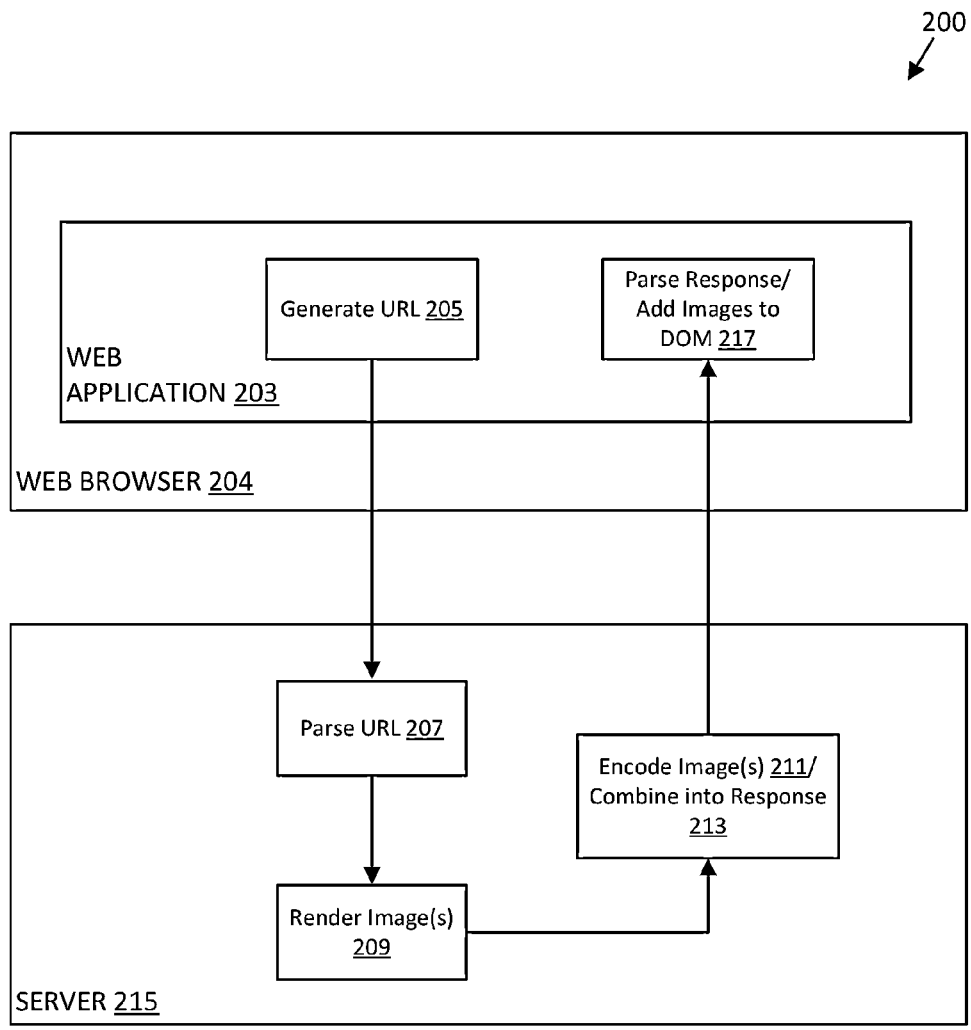
FIG. 2B illustrates a block diagram of an embodiment of a system architecture for generating and retrieving images from a server using a web application on a browser.

FIG. 2B illustrates a block diagram of another embodiment of a system architecture 200 for generating and retrieving images from a server 215 using a web application 203 on a browser 204.

As shown in FIG. 2B, in embodiments, the web application 203 generates 205 an image URL request for retrieving one or more images from server 215. The generated image URL request includes identifiers to the specific image(s) requested. That is, if a single image is requested, the image URL request includes a single identifier for the requested image. If more than one image is requested, the image URL request includes an identifier for each requested image (i.e., a batched image URL request). The web application 203 thereafter sends the image URL request (or the batched image URL request) to the server 215.

In embodiments, the server parses 207 the image URL request (or the batched image URL request) and renders 209 the requested image(s). Thereafter, server 215 encodes 211 the rendered image(s) and combines 213, if necessary, the encoded image(s) in an encoded response. That is, if a single image was requested, encoded data for the single image is provided in the encoded response. Alternatively, if more than one image was requested, encoded data for each requested image is provided in a batched encoded response.

The response is sent back to the web application 203, wherein the web application 203 parses the encoded response and adds the encoded image(s) to a DOM 217 in a proper location for each requested image.

Figure 3:
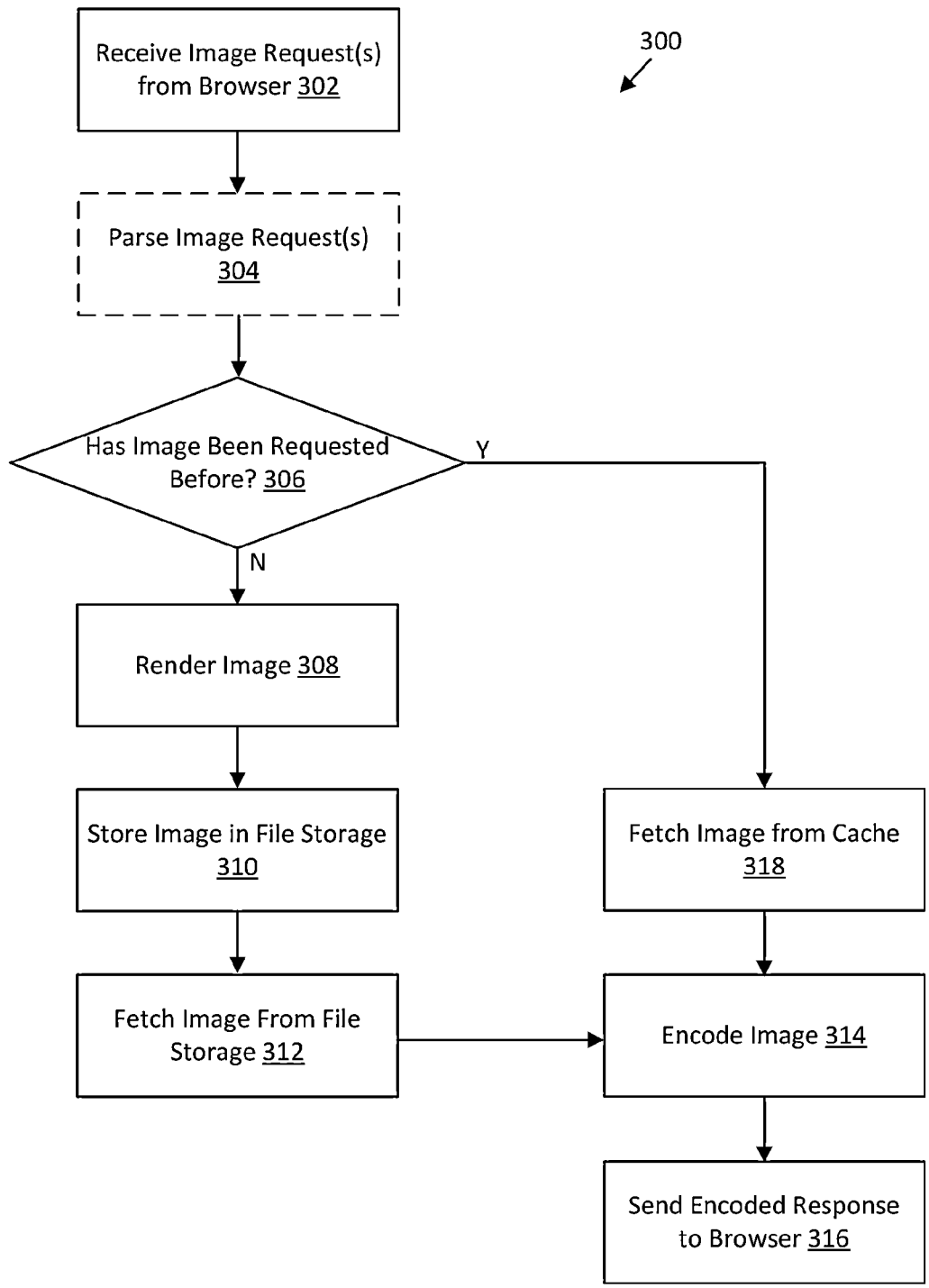
FIG. 3 illustrates a method for generating, storing, and encoding an image by a web application server.

FIG. 3 illustrates a method 300 for generating, storing, and encoding an image by a web application server (for example, web application server 215).

Method 300 begins at operation 302 in which a request for an image is received by a web application server (e.g., by frontend 216 of web application server 215) from a browser (e.g., browser 204). As described above, an image URL request comprises a unique identifier for the image that is understood by the web application server (e.g., an item identifier). For example, the image URL request may include information for rendering and/or locating the image on the web application server, as described above.

In embodiments, the item identifier for the image may be combined with several other item identifiers in a batched image URL request. Hence, in optional operation 304 (identified by dashed lines), if a batched image URL request was received in operation 302, the batched image URL request may be parsed into individual image URLs.

In operation 306, each image URL is evaluated to determine whether the corresponding image was requested before. In embodiments, this determination may be performed by checking a server cache (e.g., server cache 228) or file storage (e.g., file storage 226) for the requested image. If the image is not located in file storage or in a server cache, it may be determined that the image has not been requested before and the method proceeds to operation 308. Alternatively, if the image is located in file storage or in a server cache, it may be determined that the image has been requested before and the method proceeds to operation 318. In operation 308, a backend of the web application server (e.g., backend 220) may render the requested image by parsing the image URL request to obtain metadata that specifies parameters for rendering the image. In embodiments, after generating the image, the rendered image is stored in the file storage (e.g., file storage 226) in operation 310. In embodiments, the image may also be stored in a server cache (e.g., server cache 228).

In operation 312, the rendered image may be retrieved from the file storage or the server cache. In some embodiments, a managed backend (e.g., managed backend 218) may retrieve the rendered image from file storage or the server cache.

In embodiments, the managed backend encodes the rendered image in operation 314. In other embodiments, another component or module running on the server encodes the rendered image in operation 314. In some embodiments, the rendered image may be encoded as a base64 string, which includes sufficient image data for displaying the image on the browser.

In operation 316, the encoded image data is packaged in a response and forwarded to the browser. As explained above, if a batched image URL request was received in operation 302, the encoded image data for each requested image is combined in a batched encoded response that corresponds to the batched image URL request. Thus, the batched encoded response includes a list of images, including an item identifier for each image, a width and height for each image, an x and y offset from the document position for each image, and the encoded string for each image (e.g., a base64 encoded string).

If, in operation 306, it is determined that the image was previously requested, the web application server (e.g., via the managed backend 218) fetches the image from the server cache (e.g., server cache 228) in operation 318. The method 300 then proceeds to operations 314 and 316, as described above.

As should be appreciated, the particular steps of method 300 described above are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

Figure 4:
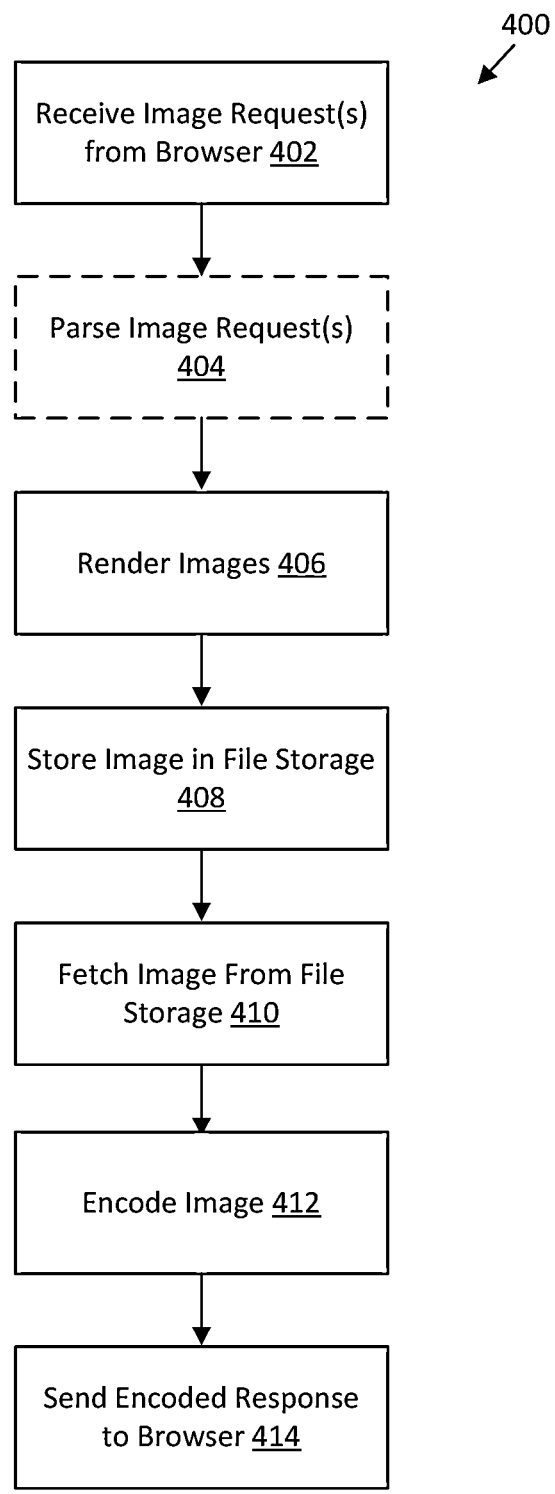
FIG. 4 illustrates a method for generating an edited image by the web application server.

FIG. 4 illustrates a method 400 for generating an edited image by a web application server (e.g., web application server 215).

Method 400 begins at operation 402 in which an image request is received by a web application server (e.g., by frontend 216) from a browser (e.g., browser 204). In this embodiment, the image request is for an image that was previously rendered, but currently edited. As described above, an image URL request comprises a unique identifier (i.e., item identifier) for the edited image that is understood by the application server. For example, the image URL request may include information for rendering the edited image on the web application server, including an item identifier that specifies a slide number (or page number), a shape number, a shape background, a version, and a device size. In this embodiment, the item identifier within the image URL request is similar to the item identifier in an initial image URL request for the original image, however now includes a new version indicating the requested image is an edited version of the original image.

As discussed above, the URL for the edited image may be combined with several other image URLs in a batched image URL request. Hence, in optional operation 404, (identified by dashed lines), if a batched image URL request was received in operation 402, the batched image URL request may be parsed into individual image URLs.

In operation 406, a backend of the web application server (e.g., backend 220) may render the edited image by parsing the image URL request to obtain metadata that specifies parameters for rendering the edited image. In embodiments, after generating the edited image, the rendered edited image is stored in the file storage (e.g., file storage 226) in operation 408. In embodiments, the edited image may also be stored in a server cache (e.g., server cache 228).

In operation 410, the rendered edited image may be retrieved from the server cache or the file storage. In some embodiments, a managed backend (e.g., managed backend 218) may retrieve the rendered edited image from file storage or the server cache.

In embodiments, the managed backend encodes the rendered edited image in operation 412. In other embodiments, another component or module running on the web application server encodes the rendered edited image in operation 412. In some embodiments, the rendered edited image may be encoded as a base64 string, which includes sufficient image data for displaying the edited image on the browser.

In operation 414, the encoded image data is packaged in a response and forwarded to the browser. As explained above, if a batched image URL request was received in operation 402, the encoded image data for each requested image is combined in a batched encoded response that corresponds to the batched image URL request. Thus, the batched encoded response includes a list of images, such as the item identifier for each image, a width and height for each image, an x and y offset from the document position for each image, and an encoded string for each requested image (e.g., a base64 encoded string). In this case, as described with respect to the image URL request, the item identifier for the edited image in the encoded response references the new version for the edited image.

As should be appreciated, the particular steps of method 400 described above are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

Figure 5:
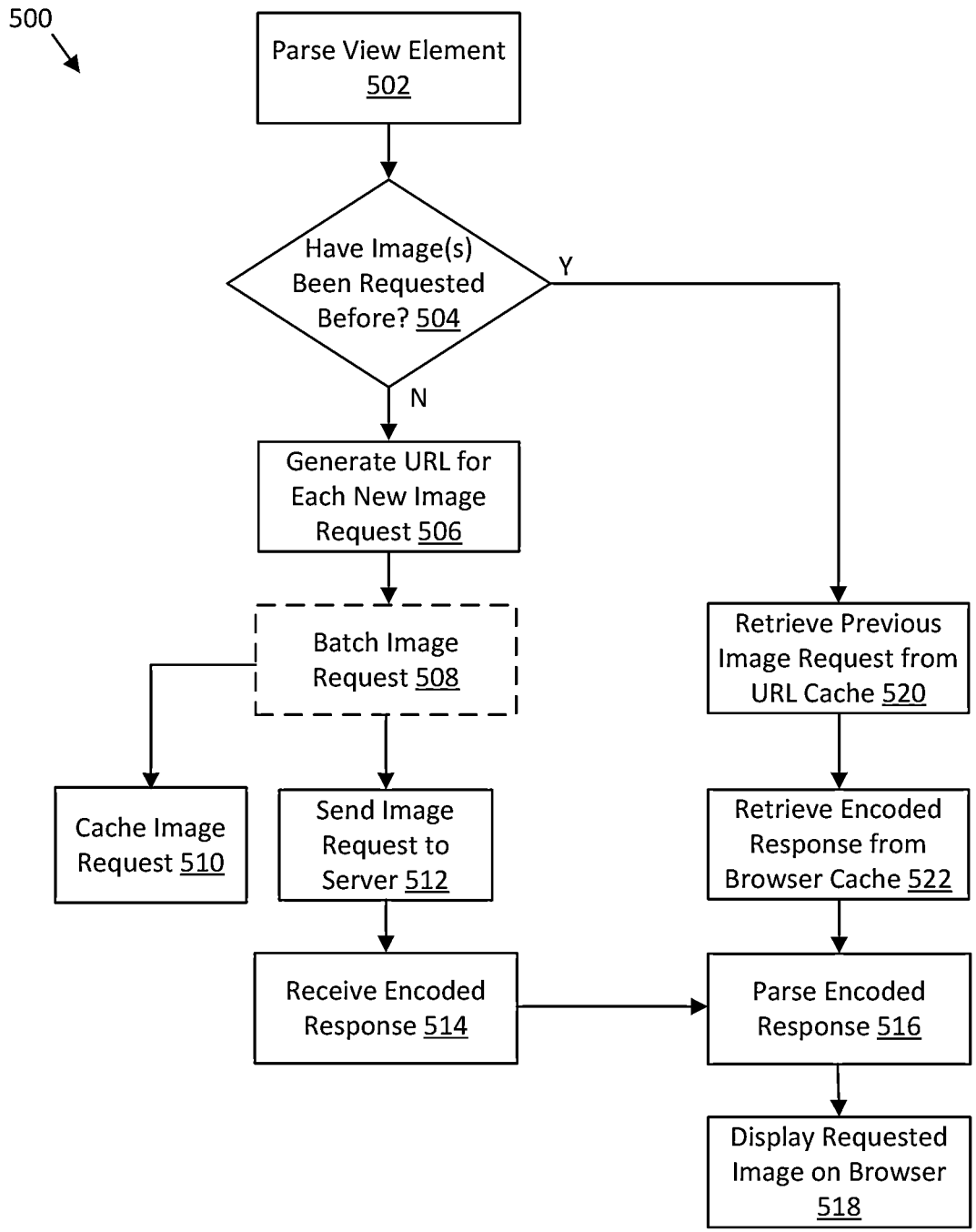
FIG. 5 illustrates a method for requesting and displaying an image by a web application client.

FIG. 5 illustrates a method 500 for requesting and displaying one or more images by a web application client (e.g., web application client 203).

Method 500 begins at operation 502 in which a view element identifying one or more images is called in response to an action by the user.

In operation 504, it is determined whether image request(s) for the one or more images were previously generated. For example, an image manager associated with the web application client (e.g., image manager 202) may determine whether image request(s) for the one or more images were previously generated by checking a URL cache (e.g., URL cache 212). As explained above, in embodiments, the URL cache stores image URL requests and batched image URL requests which were previously generated.

If image requests for the one or more images were not previously generated, for example if the user opened a new page or slide of the web application or if one or more images have been edited, an image URL request may be generated for each of the one or more images in operation 506. As described above, an image URL request includes a list of resources to fetch including a presentation identifier, a session identifier, a resolution, and an item identifier. In embodiments, an item identifier is unique to an image and therefore can be used to locate the requested image on the web application server. In embodiments, the item identifier includes one or more of: a page number or slide number, a shape number, a shape background, a version, and a device size. For example, an item identifier may be in the following format:

TABLE 1

| Item Identifier | Description |
| --- | --- |
| sld3sp4bg.jfies.55.55 | Slide 3, Shape 4, Background, Version jfies, Device size 55 by 55 |
| sld5thmb.fses.55.55 | Slide 5, Thumbnail, Version fses, Device size 55 by 55 |
| sld5bg.bdsev.67.89 | Slide 5, Background, Version bdsev, Device size 67 by 89 |

In embodiments, if more than one new image display request is received, the item identifier for each image may be combined in a batched image URL request in optional operation 508. In some embodiments, although multiple item identifiers may be combined in a batched image URL request, there may be size limitations on the number of item identifiers that may be batched. Accordingly, there may be a limit on the number of images that may be requested from the web application server in a batched image URL request.

In further embodiments, the generated image URL request (or batched image URL request) is stored in a URL cache (e.g., URL cache 212) in operation 510.

In operation 512, subsequently or simultaneously with operation 510, the generated image URL request (or batched image URL request) is sent to the web application server (e.g., web application server 215) to render images and/or fetch images from a server cache.

In operation 514, an encoded response (or a batched encoded response) is received by the web application client. In some embodiments, the encoded response (or the batched encoded response) is also stored in a browser cache (e.g., browser cache 214) on the browser. In embodiments, an encoded response includes the item identifier for the image, a width and height for the image, an x and y offset from the document position for the image, and encoded image data for the image (e.g., a base64 encoded string). In further embodiments, a batched encoded response includes a list of encoded images, the item identifier for each image, a width and height for each image, an x and y offset from the document position for each image, and encoded image data for each image (e.g., a base64 encoded string).

In operation 516, the encoded response or the batched encoded response is parsed to determine where and how to display each requested image. In embodiments, the encoded response (or the batched encoded response) may include sufficient information to display each image on the browser, as described above.

In operation 518, the one or more images identified in the view element in operation 502 are displayed in the browser.

If it is determined that image request(s) for the one or more images were previously received in operation 504, the method 500 proceeds to operation 520. In operation 520, a previously generated image URL request for each of the one or more images is retrieved from the URL cache. In some embodiments, each of the one or more images was previously requested in one previously generated image URL request (or a batched image URL request). In other embodiments, at least some of the one or more images were previously requested in different image URL requests (or batched image URL requests). Moreover, in some embodiments, at least some of the one or more images were previously requested in a batched image URL request with other images for which display requests are not currently received. According to embodiments, a previously generated image URL request for an image may be identified by any suitable means, e.g., based on an item identifier the image that is contained in a corresponding image URL request.

In operation 522, embodiments take advantage of the fact that encoded responses (or batched encoded responses) are generally stored in a browser cache by the browser upon receipt. Accordingly, upon retrieving image URL request(s) (or batched image URL request(s)) from the URL cache, the corresponding encoded responses (or batched encoded responses) may be retrieved from the browser cache. In embodiments, "corresponding" encoded responses refer to encoded responses which were previously received based on the retrieved image URL request(s) (or batched image URL request(s)). In this case, a request need not be sent to the server to obtain the images. However, in some embodiments, for example when the browser is running on a thin client (e.g., a smart phone or a tablet), this browser cache functionality may not be available.

In operation 516, as described above, the encoded response(s) or the batched encoded response(s) retrieved from the URL cache are parsed to retrieve image data for each of the previously requested images. In some embodiments, image data for some of the previously requested images may be obtained from different encoded responses. Moreover, in some cases, image data for some of the previously requested images may be obtained from batched encoded responses that include image data for images which are not to be displayed. In this case, the image data for images which are not to be displayed can be ignored. Upon retrieving image data for the images to be displayed, the method then proceeds to operation 518 as described above. In this case, operation 518 will redisplay on the browser the one or more images that were previously displayed.

As should be appreciated, the particular steps of method 500 described above are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

Figure 6:
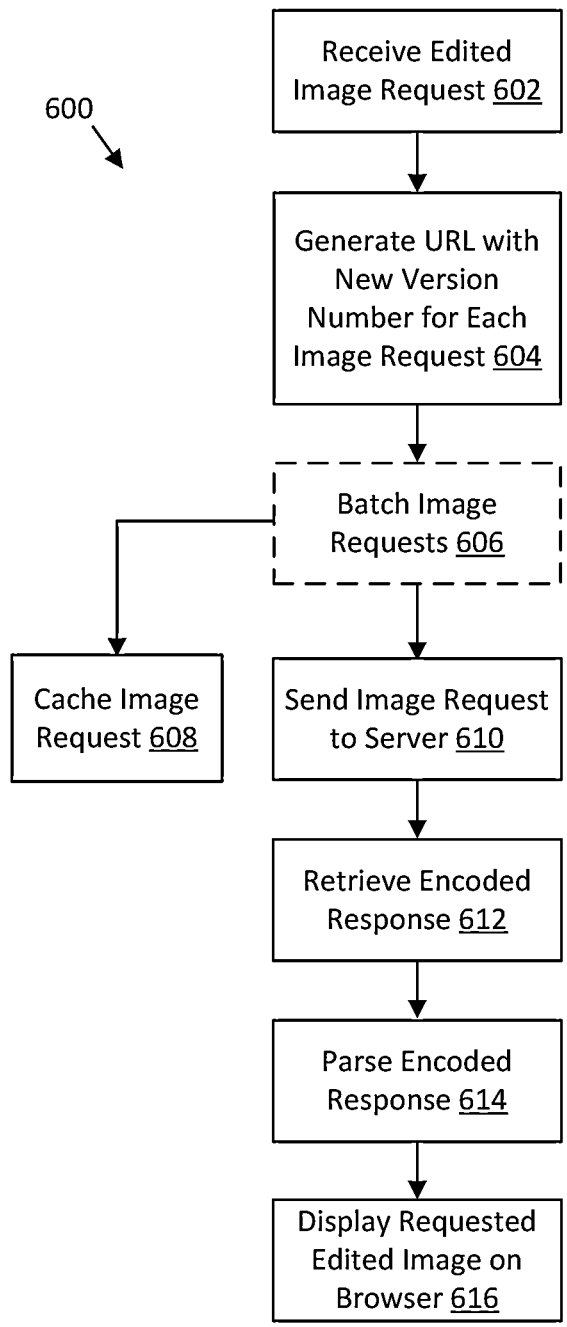
FIG. 6 illustrates a method for requesting and displaying an edited image by the web application client.

FIG. 6 illustrates a method 600 for requesting and displaying an edited image by the web application client (e.g., web application client 203).

Method 600 begins at operation 602 in which a view element identifying one or more images is called in response to an action by the user. In this embodiment, the request is for an image that was previously rendered, but currently edited. Accordingly, a display request for the edited image was not previously received. In operation 604, an image URL request may be generated for the edited image. As described above, an image URL request includes a list of resources to fetch which includes a presentation identifier, a session identifier, a resolution, and an item identifier. In embodiments, the item identifier is unique to the edited image and therefore can be used to locate the edited image on the web application server. In embodiments, the item identifier includes one or more of: a slide number (or page number), a shape number, a shape background, a version, and a device size. In this embodiment, the item identifier in the image URL request is similar to the item identifier in an initial image URL request for the original image, however now includes a new version indicating the requested image is an edited version of the original image.

In embodiments, if more than one new image is identified in the view element, the item identifier for each image may be combined in a batched image URL request in optional operation 606. Accordingly, a request for an edited image (or more than one edited image) may be combined in a batched image URL request with other image requests. In some embodiments, although multiple item identifiers may be combined in a batched image URL request, there may be size limitations on the number of item identifiers that can be batched.

In further embodiments, the generated image URL request (or batched image URL request) is stored in a URL cache (e.g., URL cache 212) in operation 608.

In operation 610, subsequently or simultaneously with operation 608, the generated image URL request (or batched image URL request) is sent to the web application server (e.g., web application server 215) to render image(s) and/or fetch image(s) from the server cache.

In operation 612, an encoded response (or a batched encoded response) is received from the web application server.

In operation 614, the encoded response or the batched encoded response is parsed to determine where and how to display each requested image. In embodiments, the encoded response (or the batched encoded response) may include sufficient information to display the edited image on the browser, as described above. In embodiments, upon parsing the encoded response (or the batched encoded response), the encoded image(s) are added to a DOM in a proper location for each requested image.

In operation 616, the one or more edited images that are identified by the view element in operation 602 are displayed in the browser.

As should be appreciated, the particular steps of method 600 described above are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
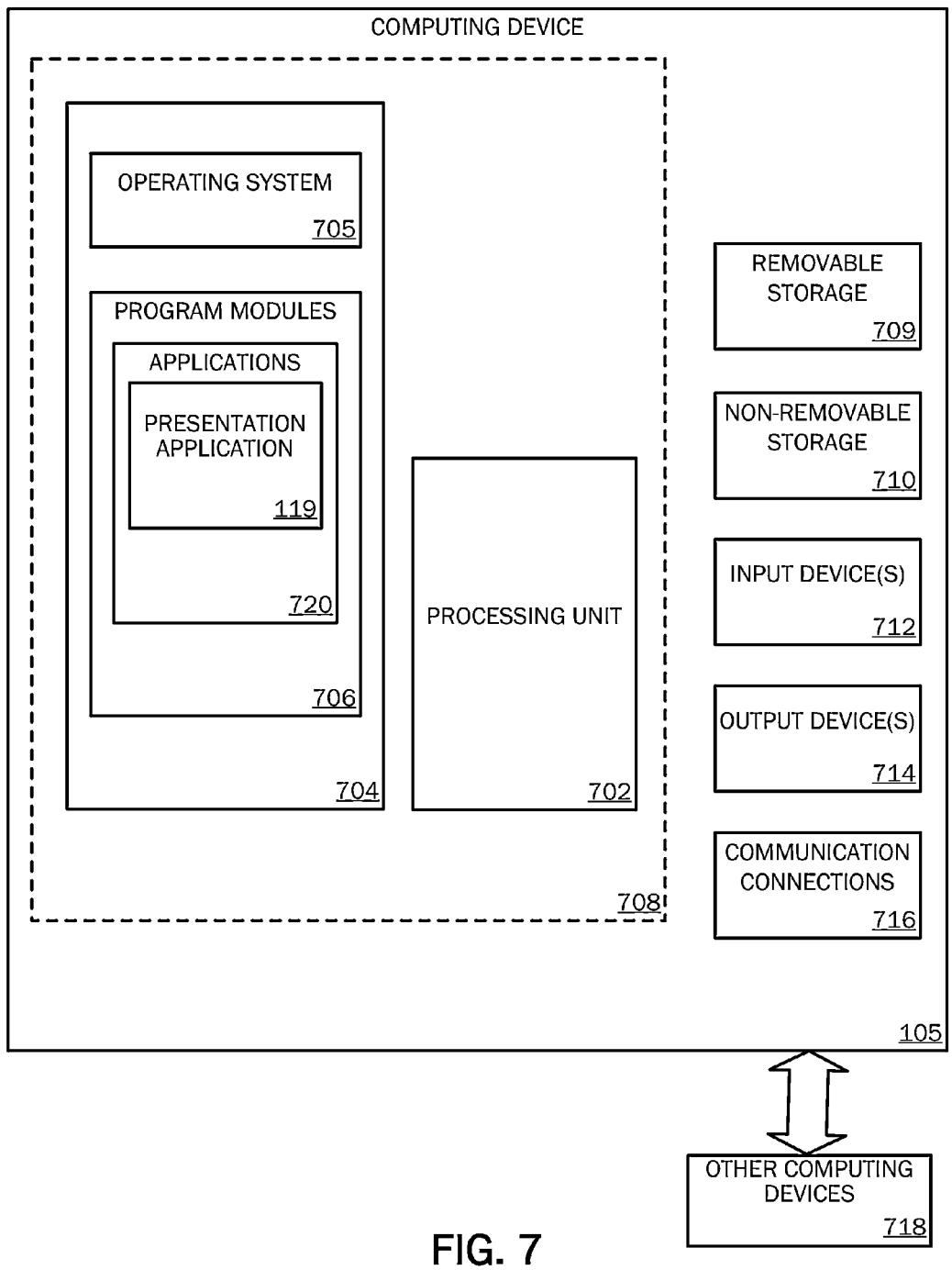
FIG. 7 is a block diagram illustrating example physical components of a computing device with which embodiments of the invention may be practiced.
Figure 8A:
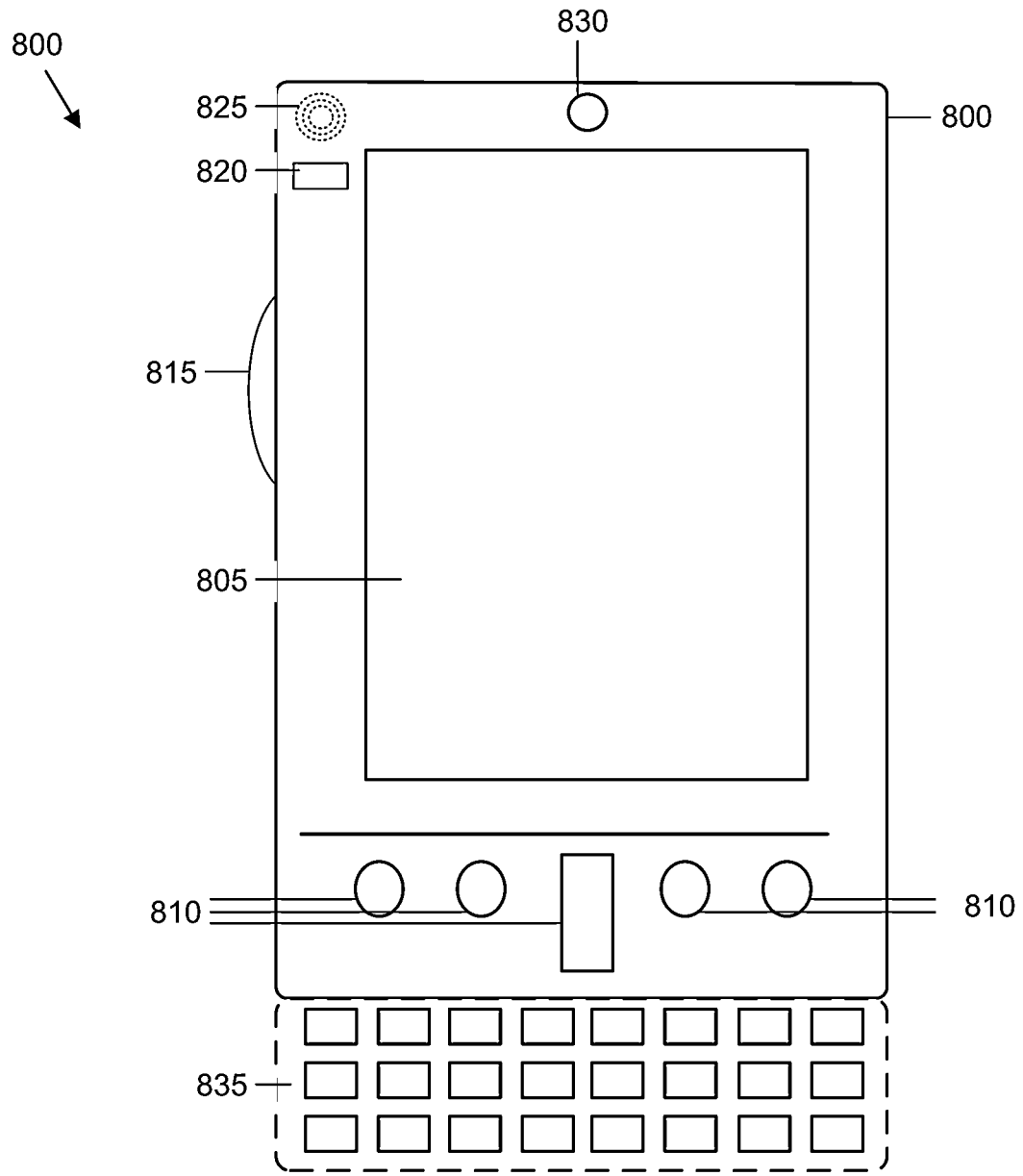
FIG. 8A illustrates one embodiment of a mobile computing device executing one or more embodiments disclosed herein.
Figure 8B:
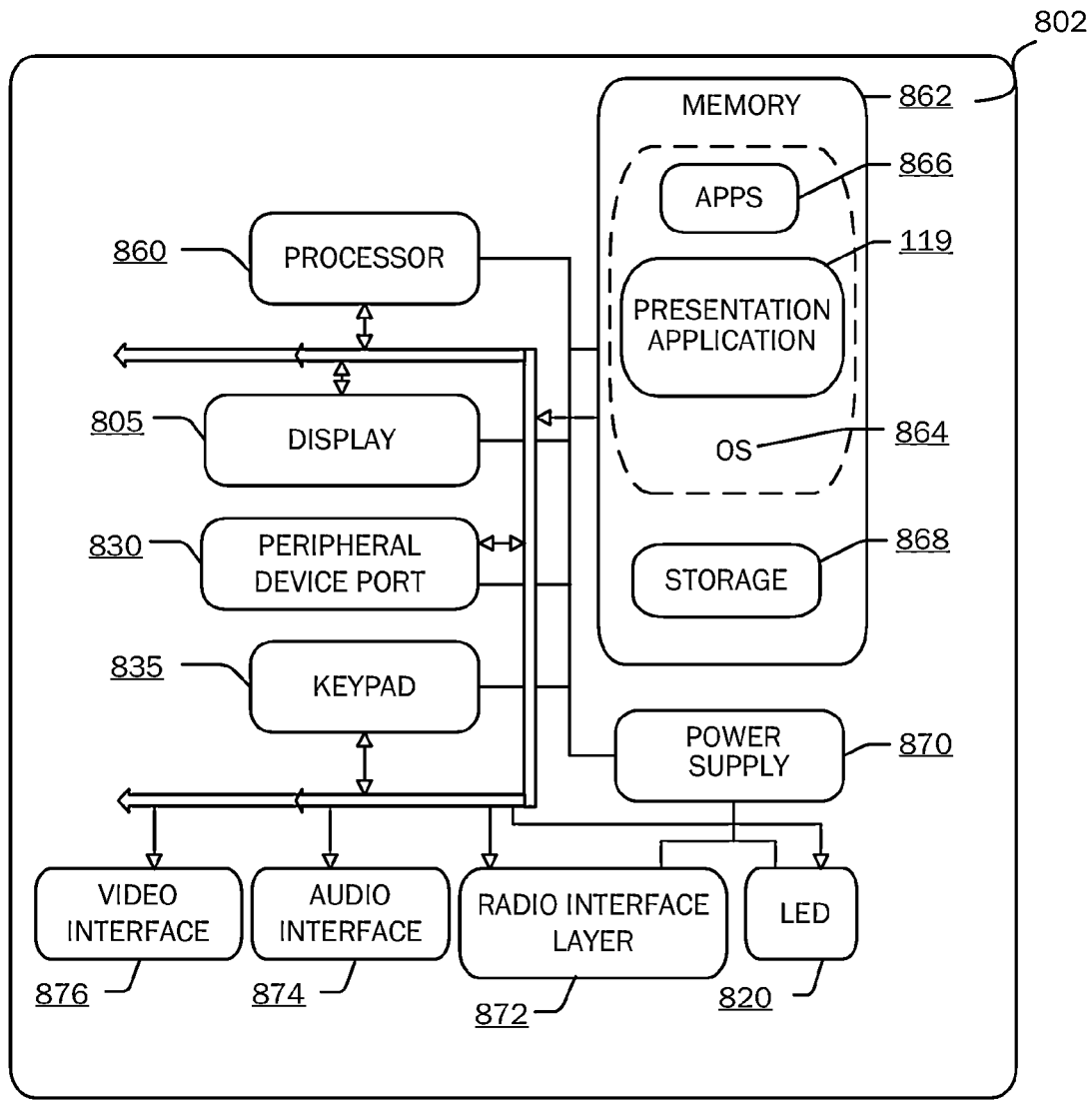
FIG. 8B is a simplified block diagram of a mobile computing device with which embodiments of the present invention may be practiced.
Figure 9:
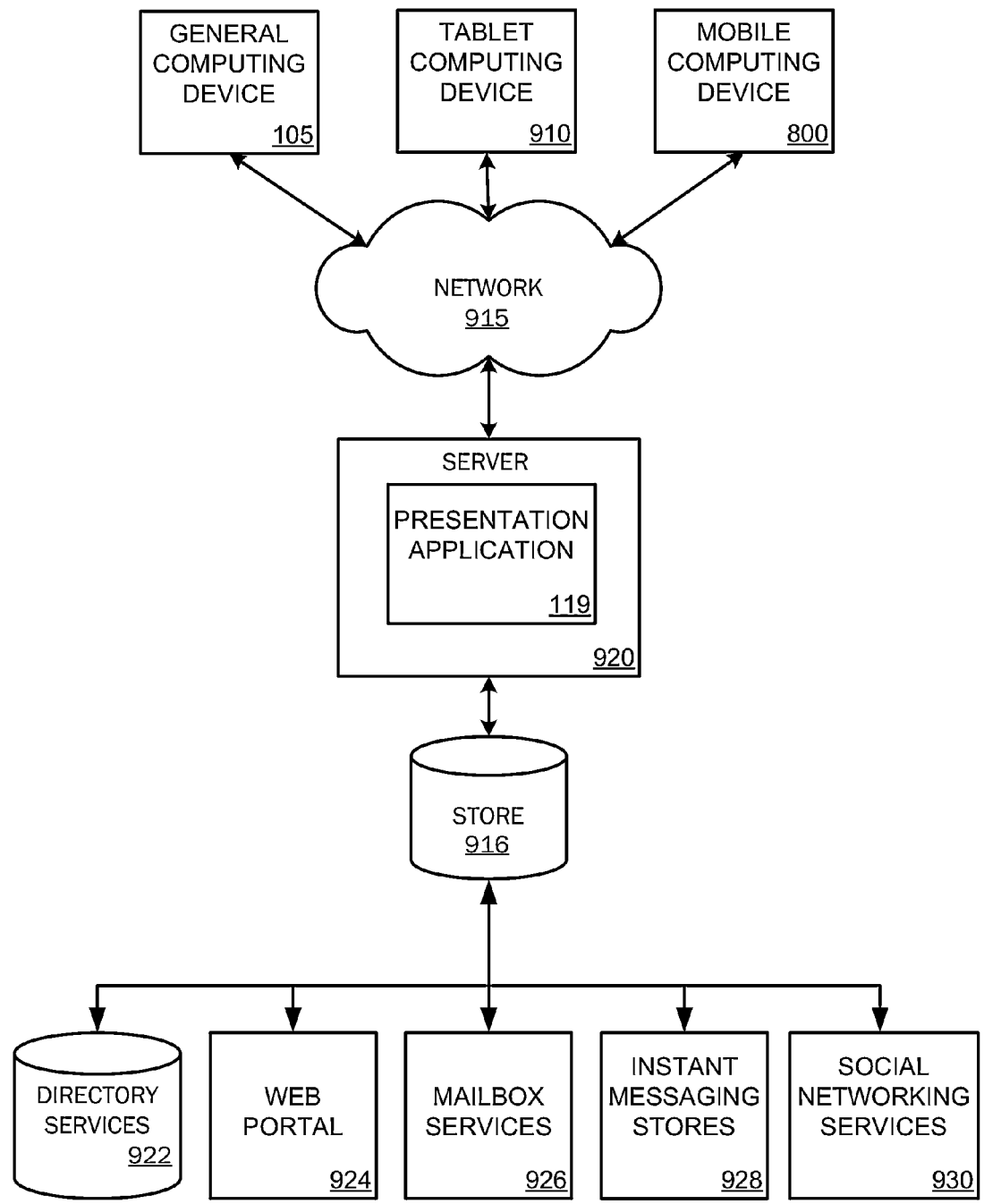
FIG. 9 is a simplified block diagram of a distributed computing system in which embodiments of the present invention may be practiced.

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 105 with which embodiments of the invention may be practiced. The computing device components described below may be suitable for the computing devices described above. In a basic configuration, the computing device 105 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as a presentation application 119. The operating system 705, for example, may be suitable for controlling the operation of the computing device 105. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 105 may have additional features or functionality. For example, the computing device 105 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., the presentation application 119) may perform processes including, but not limited to, one or more of the stages of the methods 300-600 illustrated in FIGS. 3-6. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the presentation application 119 may be operated via application-specific logic integrated with other components of the computing device 105 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 105 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 105 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.)

Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 105. Any such computer storage media may be part of the computing device 105. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which embodiments of the invention may be practiced. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the presentation application 119 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing detection and grouping of graphics elements in a fixed format document to one or more client devices, as described above. Content developed, interacted with, or edited in association with the presentation application 119 may be stored in different communication channels or other storage types. For example, various documents may be stored using a directory service 922, a web portal 924, a mailbox service 926, an instant messaging store 928, or a social networking site 930. The presentation application 119 may use any of these types of systems or the like for enabling data utilization, as described herein. A server 920 may provide the presentation application 119 to clients. As one example, the server 920 may be a web server providing the presentation application 119 over the web. The server 920 may provide the presentation application 119 over the web to clients through a network 915. By way of example, the client computing device may be implemented as the computing device 105 and embodied in a personal computer, a tablet computing device 910 and/or a mobile computing device 900 (e.g., a smart phone). Any of these embodiments of the client computing device 105, 910, 900 may obtain content from the store 916.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for displaying one or more images in a web application on a browser, the method comprising:
    determining to display a first image on the browser, wherein the first image was not previously displayed on the browser;
    generating an image request including metadata identifiers for the first image, the metadata identifiers comprising: a presentation identifier, a session identifier, a resolution, and a first item identifier, wherein the first item identifier is unique to the first image;
    storing the image request in a URL cache;
    sending, to a server, the image request for a rendered first image;
    receiving a response including: the first item identifier, a size of the first image, a position of the first image, and encoded image data of the first image;
    storing the response in a browser cache; and
    displaying the first image on the browser.

2. The method of claim 1, further comprising:
  determining to display a second image on the browser, wherein the second image was not previously displayed on the browser;
  generating a second item identifier that is specific to the second image;
  sending a batched image request for the first image and the second image to the server, wherein the batched image request references the first item identifier and the second item identifier;
  receiving a batched response containing encoded image data for the first image and encoded image data for the second image;
  storing the batched response in the browser cache; and
  displaying the first image and the second image on the browser.

3. The method of claim 2, further comprising:
  storing the batched image request for the first image and the second image.

4. The method of claim 3, further comprising:
  determining to redisplay the second image on the browser;
  retrieving the stored batched image request for the first image and the second image;
  based on the stored batched image request, retrieving the response containing the encoded image data for the first image and the encoded image data for the second image from the browser cache;
  parsing the response to obtain the encoded image data for the second image; and
  redisplaying the second image on the browser.

5. The method of claim 1, further comprising:
  receiving a second display request to redisplay the first image on the browser;
  retrieving, from the URL cache, the stored image request for the first image;
  based on the stored image request, retrieving, from the browser cache, the response containing the encoded image data for the first image; and
  redisplaying the first image on the browser.

6. The method of claim 1, wherein the image request comprises information for rendering or fetching the first image.

7. The method of claim 1, wherein the first item identifier further identifies one or more of:
  a slide;
  a shape;
  a background;
  a device size; and
  a version.

8. The method of claim 1, wherein the image request including the first item identifier is in the form of a uniform resource locater (URL).

9. The method of claim 1, wherein the encoded image data of the first image is provided in a base64 format.

10. The method of claim 1, further comprising:
  generating an edit image request for displaying an edited first image including an edited item identifier different from the first item identifier;
  caching the edit image request;
  sending, to the server, the edit image request;
  receiving a response; and
  displaying the requested edited first image.

11. A computer-readable medium storing instructions for generating one or more images for display in a web application on a browser, the instructions when executed causing a computing device to perform a method, comprising:
  receiving a batched image request for a first image and a second image from a browser, the batched image request comprising metadata identifiers for the first image and the second image, the metadata identifiers including a presentation identifier, a session identifier, a resolution, and a first identifier of the first image and a second identifier of the second image;
  following the first identifier to retrieve the first image and following the second identifier to retrieve the second image;
  generating encoded image data for the first image and encoded image data for the second image; and
  sending a batched response to the browser, the batched response including: the first identifier of the first image, a size of the first image, a position of the first image, encoded image data of the first image; the second identifier of the second image, a size of the second image, a position of the second image, and encoded image data of the second image.

12. The computer-readable medium of claim 11, wherein following the first identifier to retrieve the first image further comprises fetching the first image from an image cache.

13. The computer-readable medium of claim 11, wherein following the first identifier to retrieve the first image further comprises rendering the first image.

14. The computer-readable medium of claim 11, wherein the encoded image data for the first image is provided in a base64 format.

15. The computer-readable medium of claim 11, further comprising:
  determining that the first image has not been previously requested;
  rendering the first image, wherein rendering the first image comprises parsing the batched image request to obtain the first item identifier, which includes metadata that specifies parameters for rendering the first image; and
  storing, in file storage, the first image.

16. A computing system comprising:
  at least one processor; and
  at least one memory storing instructions that when executed by the at least one processor cause the computing system to perform a method for displaying one or more images in a web application on a browser, the method comprising:
    determining to display a first image on the browser, wherein the first image was not previously displayed on the browser;
    generating an image request including metadata identifiers for the first image, the metadata identifiers comprising: a presentation identifier, a session identifier, a resolution, and a first item identifier, wherein the first item identifier is unique to the first image;
    storing the image request in a browser cache;
    sending the image request to a server;
    receiving a response including: the first item identifier, a size of the first image, a position of the first image, and encoded image data of the first image;
    storing, in the browser cache, the response containing encoded image data;
    displaying the first image on the browser;
    determining to redisplay the first image on the browser;
    retrieving the stored image request for the first image from the browser cache;
    based on the stored image request, retrieving the response containing the encoded image data for the first image from the browser cache; and
    redisplaying the first image on the browser.

17. The computing system of claim 16, further comprising:
determining to display a second image on the browser, wherein the second image was not previously displayed on the browser;
generating a second item identifier that is specific to the second image;
sending a batched image request for the first image and the second image to the server, wherein the batched image request references the first item identifier and the second item identifier;
receiving a batched response containing encoded image data for the first image and encoded image data for the second image;
storing the batched response in the browser cache; and
displaying the first image and the second image on the browser.

18. The computing system of claim 17, further comprising:
storing the batched image request for the first image and the second image.

19. The computing system of claim 18, further comprising:
determining to redisplay the second image on the browser;
retrieving the stored batched image request for the first image and the second image;
based on the stored batched image request, retrieving the batched response from the browser cache;
parsing the response to obtain the encoded image data for the second image; and
redisplaying the second image on the browser.

20. The computing system of claim 16, wherein the first item identifier further identifies one or more of:
a slide;
a shape;
a background;
a device size; and
a version.

* * * * *